Figure 2:
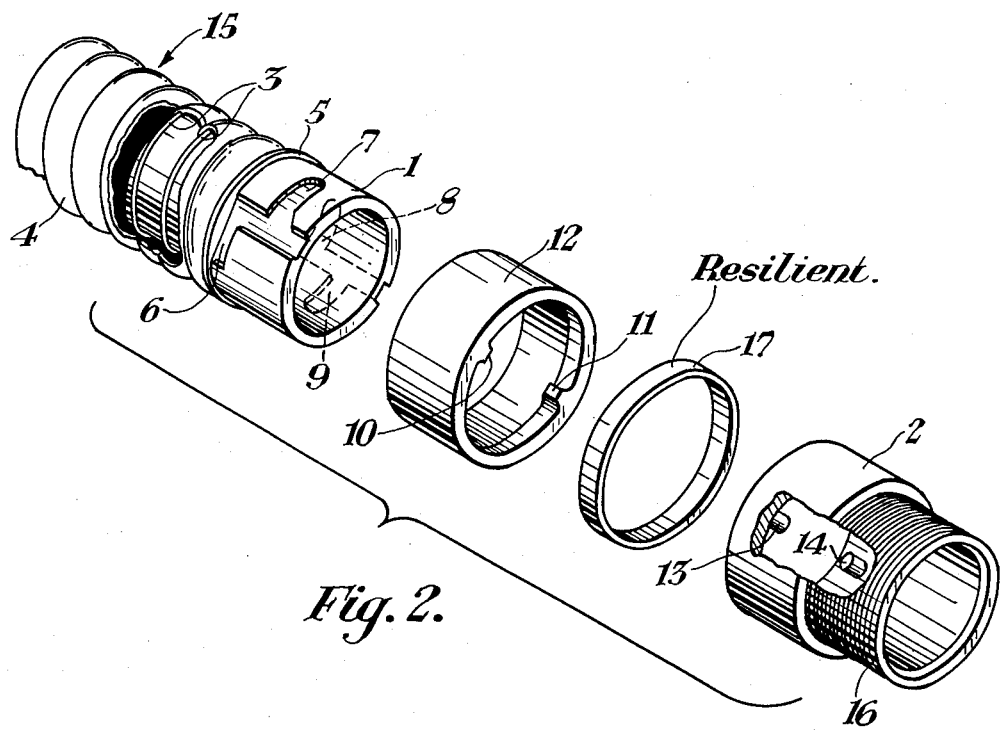

Jan. 24, 1956  R. MILLS  2,732,225
COUPLING FOR FLEXIBLE METALLIC CONDUITS
Filed May 19, 1951

INVENTOR.
Robert Mills.
BY
HIS ATTORNEY

United States Patent Office 2,732,225
Patented Jan. 24, 1956

2,732,225

COUPLING FOR FLEXIBLE METALLIC CONDUITS

Robert Mills, New York, N. Y., assignor to Westinghouse Air Brake Company, a corporation of Pennsylvania Application May 19, 1951, Serial No. 227,141

3 Claims. (Cl. 285—2)

My invention relates to a novel and improved form of coupling for flexible metallic conduits which coupling is adapted to connect the end of such conduit to a junction box, signal case or the like.

Railway signaling systems utilize various types of electrically controlled equipment, for example, crossing gates, light signals, electrically operated switches, etc. This equipment normally has associated with it relatively short lengths of wire which must be protected against physical impairment to insure the reliable operation of the equipment. A protective covering must be provided which is not only durable, but which is also flexible because of the type of connections which are sometimes necessary and because the wires must sometimes pass around obstructions. Spirally wound flexible metallic conduits suit the purpose admirably.

Consider a searchlight type signal mounted on the top of a signal mast and the control wires therefore which are normally encased within the mast itself for a portion of their length, but which wires pass out of the mast at its top to be led into the signal case. A relatively short length of flexible conduit is required to shield the wires between the signal mast and the signal case. Such conduit may be provided with a sleeve secured to the conduit at one end and having a threaded portion extending beyond the length of the conduit which threaded portion may for example be screwed into a threaded hole in the signal mast. After the one end of the conduit is substantially secured in this manner it becomes necessary to connect the other end of the conduit to the signal case without detaching the end already connected to the mast.

It is an object of my invention to provide a novel and improved coupling means suitable for connecting one end of a flexible conduit to a junction box, signal case or the like without disconnecting the other end of the conduit from some other structure to which such other end has already been substantially secured.

It is a further object of my invention to provide a novel and improved coupling means suitable for connecting one end of a flexible conduit to a junction box, signal case or the like without disconnecting the other end of the conduit from some structure to which such other end has already been substantially secured, which coupling means is also effective to provide a protective shield over the joint formed between the flexible conduit and the coupling means.

Other objects and advantages of my invention will appear as the course of the specification progresses.

To attain the objects and advantages of my invention, I provide novel and improved coupling means for connecting one end of a length of flexible conduit to a junction box, signal case or the like which conduit is provided with means for connecting its other end to some other structure.

The coupling means includes a first section which is secured within the conduit with only a portion projecting therefrom. Such projecting portion is provided with at least four slots two of which are engaged by inwardly projecting pins of a collar to form a bayonet type connection between such collar and the first section. The collar extends over the joint formed between the end of the conduit and the first section to provide a protective covering for the joint. A part of the projecting portion of the first section extends beyond the collar which part includes the other two of the aforementioned slots. These slots are engaged by inwardly projecting pins on one end of the second section of the coupling to form a bayonet type connection between the second section and the first section. Means are provided at the other end of the second section for connecting such second section to a junction box, signal case or the like. The collar and second section are separated by a washer of resilient material which gives resiliency to the connection.

I shall describe one form of apparatus embodying my invention and shall then point out the novel features thereof in claims.

Figure 1:
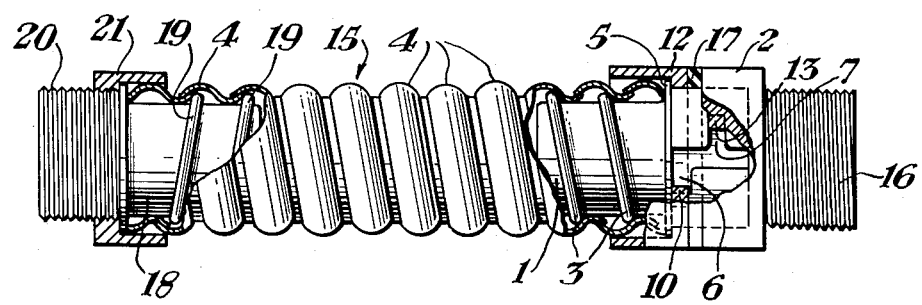

In the accompanying drawings Fig. 1 is a side elevational view of my coupling with the parts in their assembled relationship and with portions of the coupling shown in section which coupling is shown connected to one end of a flexible metallic conduit, the other end of which is provided with other suitable connecting means. Fig. 2 is a perspective view showing the parts of my coupling disengaged. Similar reference characters refer to similar parts in both figures.

Referring to the drawings, reference character 15 designates a length of spirally wound flexible metallic conduit to which a first section 1 of my coupling is secured, the first section 1 being tubular in form and having a number of serrations 3 formed on a portion of its outer surface which serrations are screwed into the convolutions 4 of the conduit. Tubular section 1 projects beyond the end of the conduit 15 for a portion of its length, the section having a flange 5 formed thereon which abuts against the end of the conduit. Such projecting portion, as shown in the drawings, has a somewhat greater outside diameter than that portion of the section which is screwed into the conduit.

The projecting portion of section 1 is provided with at least four slots 6, 7, 8 and 9 (Fig. 2) of which two, 6 and 8, are located near one end of the projecting portion of the first section at approximately diametrically opposite locations, the other two slots 7 and 9 being located near the other end of such projecting portion also at approximately diametrically opposite locations. Each slot extends parallel with the axis of tubular section 1 for a certain distance and then turns at right angles to extend circumferentially about the projecting portion of the section becoming gradually shallower and terminating before reaching the circumferential portion of the diametrically opposite slot. Slots 6 and 8 which are nearest the one end of the projecting portion of section 1 extend circumferentially about such projecting portion in one direction with respect to the axis of the section, while slots 7 and 9 extend circumferentially about such projecting portion in the other direction with respect to the axis of the section.

Slots 6 and 8 are engaged by inwardly projecting pins 10 and 11 of a collar 12 to form a bayonet type connection between such collar and section 1. Collar 12 extends over the joint formed between conduit 15 and abutting flange 5 to form a protective shield for such joint. A part of the projecting portion of section 1 extends beyond collar 12, which part includes the other two of the aforementioned slots, namely slots 7 and 9. These slots are engaged by inwardly projecting pins 13 and 14 on one end of second section 2 of my coupling to form a bayonet type connection between second section 2 and first section 1. Means such as screw thread 16 are provided at the other end of second section 2 for connecting the second section to a junction box, signal case or the like. The projecting portion of first section 1 is fitted with a washer 17 of resilient material which is engaged by collar 12 and second section 2 giving resiliency to the connection.

The conduit is provided with other connecting means at the end opposite from that which is connected to the coupling hereinbefore described. Such means as shown may comprise a sleeve 18 provided on a portion of its length with serrations 19 which are screwed into the convolutions of the conduit. The sleeve 18 also has a threaded portion 20 which projects from the end of the conduit, and which is engaged by a threaded collar or ring 21.

Assume that one end of a relatively short length of flexible conduit fitted in the manner hereinbefore described is to be connected to a signal mast and the other end of the conduit is to be connected to the signal case of a light signal, both the signal mast and the signal case having threaded openings to receive threaded portion 20 of sleeve 18 and screw thread 16 on second section 2, respectively. Threaded portion 20 is screwed into the threaded opening in the signal mast a distance corresponding to substantially the full length of the available threads on sleeve 18. Second section 2 being detachable, is uncoupled from first section 1 and screwed into the threaded opening in the signal case until a tight fit is obtained. The bayonet connection may now be completed between the first and second sections and in completing this connection it may be necessary to back off threaded portion 20 of sleeve 18 slightly in the threaded hole of the signal mast in order to permit the connection to be made between sections 1 and 2. As a final step, collar 21 is screwed tightly up against the signal mast to provide a tight connection between the conduit and the signal mast.

It will now be apparent that I have provided a coupling means for connecting one end of a length of flexible conduit to a junction box, signal case or the like without detaching the other end of the conduit from some other structure to which it has already been substantially secured. Such coupling means includes a first section attached to the conduit, a detachable collar which is coupled to the first section by means of a bayonet type connection and which collar forms a protective shield for the joint formed between the end of the conduit and the first section. A detachable second section is provided which section is also coupled to the first section by means of a bayonet type connection. A washer of resilient material forms a resilient joint between the collar and said first section when the parts of the coupling are in their assembled relationship.

Although I have herein shown and described only one form of a coupling for flexible metallic conduits, it is to be understood that various changes and modifications may be made therein within the scope of the appended claims without departing from the spirit and scope of my invention.

Having thus described my invention, what I claim is:

1. A coupling for flexible metallic conduits, comprising a tubular first section adapted for attachment to the end of a conduit and having a portion which is to extend beyond the length of said conduit when said first section is attached to the conduit, said projecting portion of said first section being provided with longitudinal slots, each slot having a circumferential branch extending in one direction and an axially spaced circumferential branch extending in the other direction, a collar slidable over said projecting portion of said first section and having inwardly projecting pins for engaging the circumferential branch of the slots extending in one direction to form a bayonet type connection between said first section and the collar whereby said collar provides a protective covering for the joint formed between the end of the conduit and said first section when said bayonet type connection is completed, a second section also slidable over said projecting portion of said first section and having inwardly projecting pins at one end for engaging the circumferential branch of the slots extending in the other direction to form a bayonet type connection between said first and said second sections, said second section having means for connecting said second section to a junction box, signal case or the like.

2. A coupling for flexible metallic conduits, comprising a first section adapted for attachment to the end of a conduit and having a portion which is to extend beyond the length of said conduit when said first section is attached to the conduit, said projecting portion of said first section being provided with a plurality of longitudinal slots, each slot having a circumferential branch extending in one direction and an axially spaced circumferential branch extending in the other direction, a collar slidable over said projecting portion of said first section and having inwardly projecting pins for engaging the circumferential branch of the slots extending in one direction to form a bayonet type connection between said first section and said collar whereby to provide a protective covering for the joint formed between the end of the conduit and said first section when said bayonet type connection is completed, a second section also slidable over said projecting portion of said first section and having inwardly projecting pins at one end for engaging the circumferential branch of the slots extending in the other direction to form a bayonet type connection between said first and said second sections, means at the other end of said second section for connecting said second section to a junction box, signal case or the like, and a washer of resilient material for assembly between the said first and second sections when the parts of the coupling are in their assembled relationship.

3. A coupling for a spirally wound flexible metallic conduit, comprising a tubular first section, one end of which has serrations formed thereon for screwing said first section into one end of the conduit and the other end of which is to extend beyond the length of said conduit when said first section is secured within the conduit, said other end of said first section being provided with longitudinal slots, each slot having a circumferential branch extending in one direction and an axially spaced circumferential branch extending in the other direction, a collar slidable over said other end of said first section and having inwardly projecting pins for engaging the circumferential branch of the slots extending in one direction to form a bayonet type connection between said first section and the collar, said collar providing a protective covering for the joint formed between the end of the conduit and said first section when said bayonet type connection is completed, a second section also slidable over said other end of said first section and having inwardly projecting pins at one end for engaging the circumferential branch of the slots extending in the other direction to form a bayonet type connection between said first and said second sections, said second section having a threaded portion at its other end for connecting said second section to a junction box, signal case or the like, and means forming a resilient joint included between the collar and said second section when the parts of the coupling are in their assembled relationship.

References Cited in the file of this patent

UNITED STATES PATENTS

| Number | Name | Date |
|---|---|---|
| 1,249,038 | Dabney | Dec. 4, 1917 |
| 1,591,871 | Heinrick | July 6, 1926 |
| 1,830,276 | Hunter | Nov. 3, 1931 |
| 1,968,075 | Ewald | July 31, 1934 |
| 2,230,098 | Wurzburger | Jan. 28, 1941 |
| 2,490,687 | Guarnaschelli | Dec. 6, 1949 |
| 2,562,014 | Buhayar | July 24, 1951 |